(12) United States Patent
Kikuchi (10) Patent No.: US 8,605,178 B2
(45) Date of Patent: Dec. 10, 2013

(54) SOLID-STATE IMAGING APPARATUS AND METHOD FOR DRIVING THE SAME

(75) Inventor: Shin Kikuchi, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 979 days.

(21) Appl. No.: 12/699,102

(22) Filed: Feb. 3, 2010

(65) Prior Publication Data

US 2010/0231767 A1    Sep. 16, 2010

(30) Foreign Application Priority Data

Mar. 11, 2009   (JP) .................... 2009-058342

(51) Int. Cl.
*H04N 5/335*    (2011.01)

(52) U.S. Cl.
USPC ............................. 348/301; 348/306

(58) Field of Classification Search
USPC .................. 348/241–249, 297–324
See application file for complete search history.

(56) References Cited

U.S. PATENT DOCUMENTS

| | | | |
|---|---|---|---|
| 6,307,195 B1 | 10/2001 | Guidash | 250/208.1 |
| 6,747,264 B2 * | 6/2004 | Miida | 250/214 AG |
| 7,123,301 B1 * | 10/2006 | Nakamura et al. | 348/301 |
| 7,205,523 B2 * | 4/2007 | Mishima et al. | 250/208.1 |
| 7,508,433 B2 | 3/2009 | Koseki et al. | 348/300 |
| 2004/0021058 A1 * | 2/2004 | Drowley et al. | 250/208.1 |

FOREIGN PATENT DOCUMENTS

| | | |
|---|---|---|
| EP | 1 465 410 A2 | 10/2004 |
| EP | 1 096 790 B1 | 3/2008 |
| JP | 2004-297546 A | 10/2004 |
| JP | 2005-143078 A | 6/2005 |
| JP | 2009-021920 A | 1/2009 |

OTHER PUBLICATIONS

Office Action issued by the Japanese Patent Office on Mar. 12, 2013, in counterpart Japanese Appl'n. No. 2009-058342.

* cited by examiner

*Primary Examiner* — James M Hannett
*Assistant Examiner* — Akshay Trehan
(74) *Attorney, Agent, or Firm* — Fitzpatrick, Cella, Harper & Scinto (57) ABSTRACT

An object of the present invention is to provide a solid-state imaging apparatus capable of providing a high S/N ratio in a plurality of operation modes, and a method for driving the same. Provided is a solid-state imaging apparatus including: a plurality of pixels (1), each of the pixels including a photoelectric conversion unit for generating a charge by photoelectric conversion and accumulating the charge; and an amplifier 2 connected to a plurality of the pixels, to amplify the charge generated by the pixels, wherein the amplifier 2 includes an offset voltage setting unit (SW1) for setting at least two offset voltages.

7 Claims, 5 Drawing Sheets

SOLID-STATE IMAGING APPARATUS AND METHOD FOR DRIVING THE SAME

BACKGROUND OF THE INVENTION

1. Field of the Invention

The present invention relates to a solid-state imaging apparatus and a method for driving the same.

2. Description of the Related Art

U.S. Pat. No. 6,307,195 describes a solid-state imaging apparatus in which charge overflowed from a photoelectric conversion unit during optical charge accumulation flows into a floating diffusion (FD) unit via a transfer gate, and discloses a dynamic range expansion method. In this case, a reset signal is read out after a light signal is read out.

Japanese Patent Application Laid-Open No. 2004-297546 discloses a solid-state imaging apparatus in which charges accumulated in pixels are read out by means of amplifiers provided for each column of the pixels arranged in plural columns. A read out circuit with an amplifier provided for each column is called a columnar amplifying system, which is known as being able to reduce random noise.

Japanese Patent Application Laid-Open No. 2004-297546 describes that after a reset signal corresponding to resetting of a pixel is read out, an optical signal, which is based on a charge accumulated in a photoelectric conversion unit, is read out.

SUMMARY OF THE INVENTION

When providing both the dynamic range expansion technique described in U.S. Pat. No. 6,307,195 and the columnar amplifying system described in Japanese Patent Application Laid-Open No. 2004-297546 by means of one sensor, a problem arises in that the dynamic range of the column amplifiers is narrowed. The details are provided below.

Where an amplifier arranged for each of a plurality of columns of pixels (hereinafter referred to as "column amplifier"), which is disclosed in Japanese Patent Application Laid-Open No. 2004-297546 is an inversion amplifier, when an optical signal is read out after a reset signal is read out, the output of the amplifier changes from a low voltage to a high voltage. When the optical signal is multiplied by a gain in the column amplifier, the change results in generation of a signal corresponding to an input voltage multiplied by the gain. In order to use the full output range of the amplifier, the output of the column amplifier may be set so that a reset output is the lower limit of the output range of the column amplifier, by a clamping operation.

Where such setting is employed in a technique such as disclosed in U.S. Pat. No. 6,307,195, because of a reset signal being read out after an optical signal being read out, the output voltage changes from a high voltage to a low voltage. However, by a clamping operation, the output of a column amplifier is set so as to be the lower limit of its output range, and thus, when an optical signal is input, the amplifier attempts to provide a further lower output, resulting in the output being saturated.

Furthermore, where the column amplifier is set in a clamping operation so as to provide an output of an intermediate level in its output range, in each reading, the output range is reduced by half.

An object of the present invention is to provide a solid-state imaging apparatus capable of providing a high S/N ratio in a plurality of operation modes, and a method for driving the same.

In order to achieve the above object, according to an aspect of the present invention, a solid-state imaging apparatus comprises; a plurality of pixels, wherein each of the pixels includes a photoelectric conversion unit for generating a charge by photoelectric conversion and accumulating the charge, and an amplifier connected to the plurality of pixels, which amplifies the charge generated by the photoelectric conversion, and wherein the amplifier includes an offset voltage setting unit for setting at least two offset voltages to the amplifier.

According to a further aspect of the present invention, a driving method of a solid-state imaging apparatus comprising; a plurality of pixels, wherein each of the pixels including a photoelectric conversion unit for generating a charge by photoelectric conversion and accumulating the charge, and an amplifier connected to the plurality of pixels, to amplify the charge generated by the photoelectric conversion, comprises a offset voltage setting step of setting different offset voltages for the amplifier according to an operation mode.

By setting of different offset voltages, an advantage that a suitable dynamic range for each of the operation modes can be used to provide a high S/N ratio in each operation mode can be provided.

Further features of the present invention will become apparent from the following descriptions of exemplary embodiments with reference to the attached drawings.

DESCRIPTION OF THE EMBODIMENTS

Preferred embodiments of the present invention will now be described in detail in accordance with the accompanying drawings.

(First Embodiment)

Figure 1:
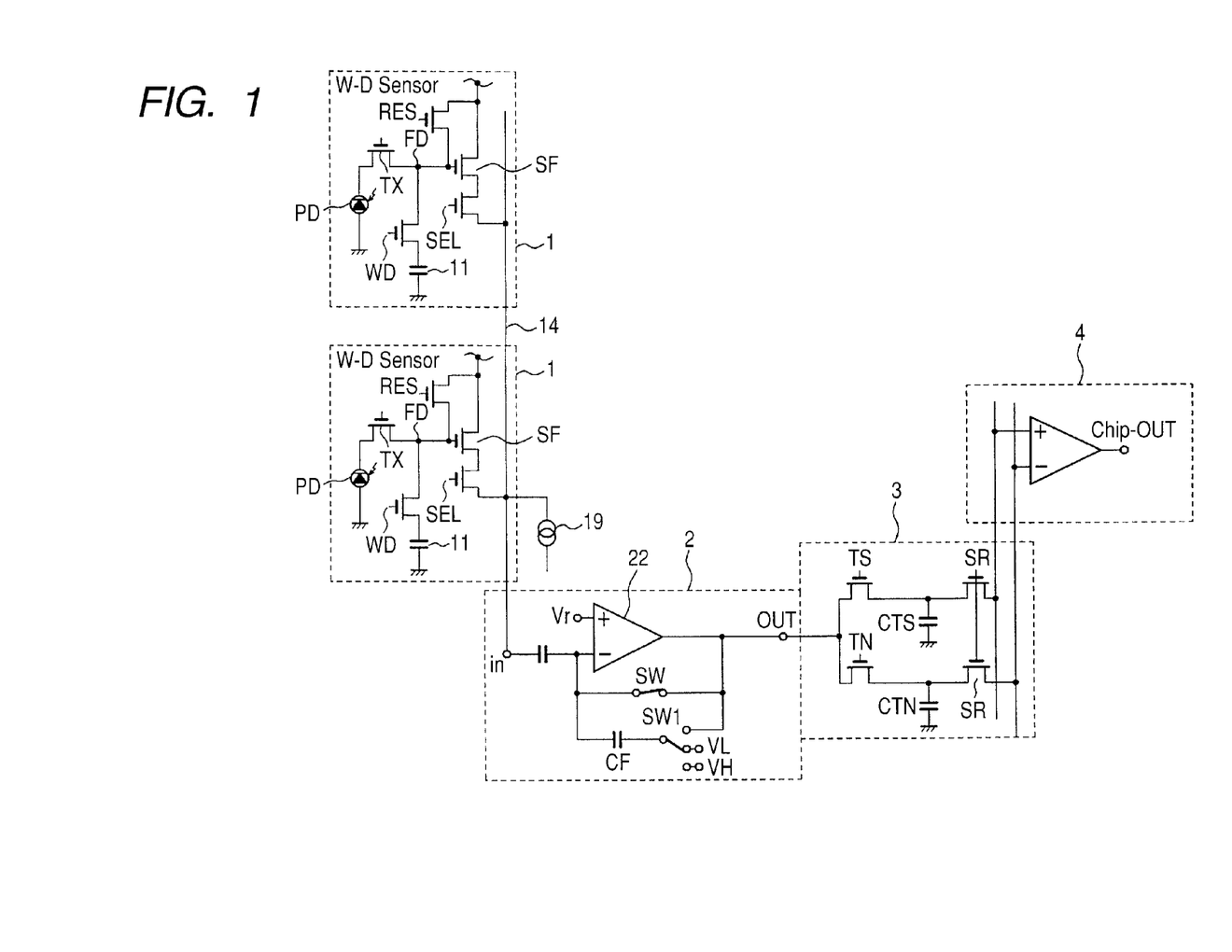
FIG. 1 is a circuit diagram illustrating an example configuration of a solid-state imaging apparatus according to a first embodiment of the present invention.

FIG. 1 is a circuit diagram illustrating an example configuration of a solid-state imaging apparatus according to a first embodiment of the present invention, which illustrates circuits for two pixels in a certain column and a read out circuit connected to a signal output line 14, to which these two pixels are connected in common, from the solid-state imaging apparatus in which pixels are two-dimensionally arranged.

Pixels (sensor and pixel circuits) 1 are pixels enabling provision of a wide dynamic range. Each pixel 1 includes a photoelectric conversion unit PD, an output source follower transistor SF, a capacitor 11 for a wide dynamic range, a switch WD, a pixel signal transfer switch TX, a pixel reset switch RES and a row selection switch SEL. FIG. 1 illustrates a signal output line 14 and a current source 19 as well. The photoelectric conversion unit PD, which may be, for example, a photo diode, generates a charge by photoelectric conversion and accumulate the charge. A floating diffusion unit FD can accumulate charge. The pixels 1 are arranged in a matrix.

An amplifier (column amplifier) 2, which is connected in common to a plurality of pixels via the signal output line 14, amplifies the charge generated by the pixels 1. The amplifier 2 includes an operational amplifier 22, an output terminal OUT of the operational amplifier 22, and a feedback capacitor CF. An offset voltage setting switch (offset voltage setting unit) SW1 can set at least two offset voltages. Here, an example in which the offset voltage setting switch SW1 is configured so as to be connected to a power supply VL or VH is illustrated. The amplifier 2 also includes a rest switch SW for a feedback capacitor CF, and an input capacitor C0.

A signal holding unit 3 includes a capacitor CTN that holds a signal at the time of a reset, a capacitor CTS that holds an optical signal, and switches TS and TN that perform sampling and holding of the output of the amplifier 2. Charges accumulated in the capacitors CTS and CTN are output to an output amplifier 4 via a switch SR. The switch SR is controlled by a scanning circuit. The output amplifier 4 amplifies the difference between the voltages of the capacitors CTS and CTN, and outputs the amplified difference from an output terminal Chip-OUT.

The present embodiment is particularly suitable for a solid-state imaging apparatus including an amplifier 2 including a clamping capacitor C0, and having a plurality of read modes. In the present embodiment, description will be provided on a solid-state imaging apparatus adapted to a normal operation mode for reading out a charge accumulated in the photoelectric conversion unit PD, and a dynamic range expansion operation mode using charge overflowed from the photoelectric conversion unit PD as a dynamic range expansion signal. The solid-state imaging apparatus according to the present embodiment can select between the normal operation mode and the dynamic range expansion operation mode.

A further detailed description of the present embodiment will be provided below. The amplifier 2 according to the present embodiment, which includes the operational amplifier 22 and the feedback capacitor CF, is configured so that one terminal of the feedback capacitor CF can selectively be connected to the high voltage VH or the low voltage VL via the switch SW1. A positive input electrode ("+" input terminal) of the operational amplifier 22 is provided with a voltage Vr, which is a reference.

As a characteristic operation of the present embodiment, first, when initializing (resetting) the feedback capacitor CF, the output terminal OUT is made to cause a short-circuit with an inverting input electrode ("−" input terminal), and an end of the feedback capacitor CF is made to cause a short-circuit with a node of the high voltage VH or the low voltage VL. Subsequently, the end of the feedback capacitor CF is made to cause a short-circuit with the output terminal OUT.

As a result of the above, the operational amplifier 22 can provide a variable offset voltage, and also can set the voltage immediately after a reset to the high voltage VH or the low voltage VL, enabling provision of a favorable operation in both the dynamic range expansion operation mode and in the normal operation mode. According to the present embodiment, a signal can be output at a point of operation favorable for each of a plurality of operation modes, using the operational amplifier 22, which is a simple circuit.

In the present embodiment, an ordinary operational amplifier 22 provides the dynamic range expansion operation mode and the normal operation mode, which will be described using the timing charts illustrated in FIGS. 2 and 3, respectively.

Figure 2:
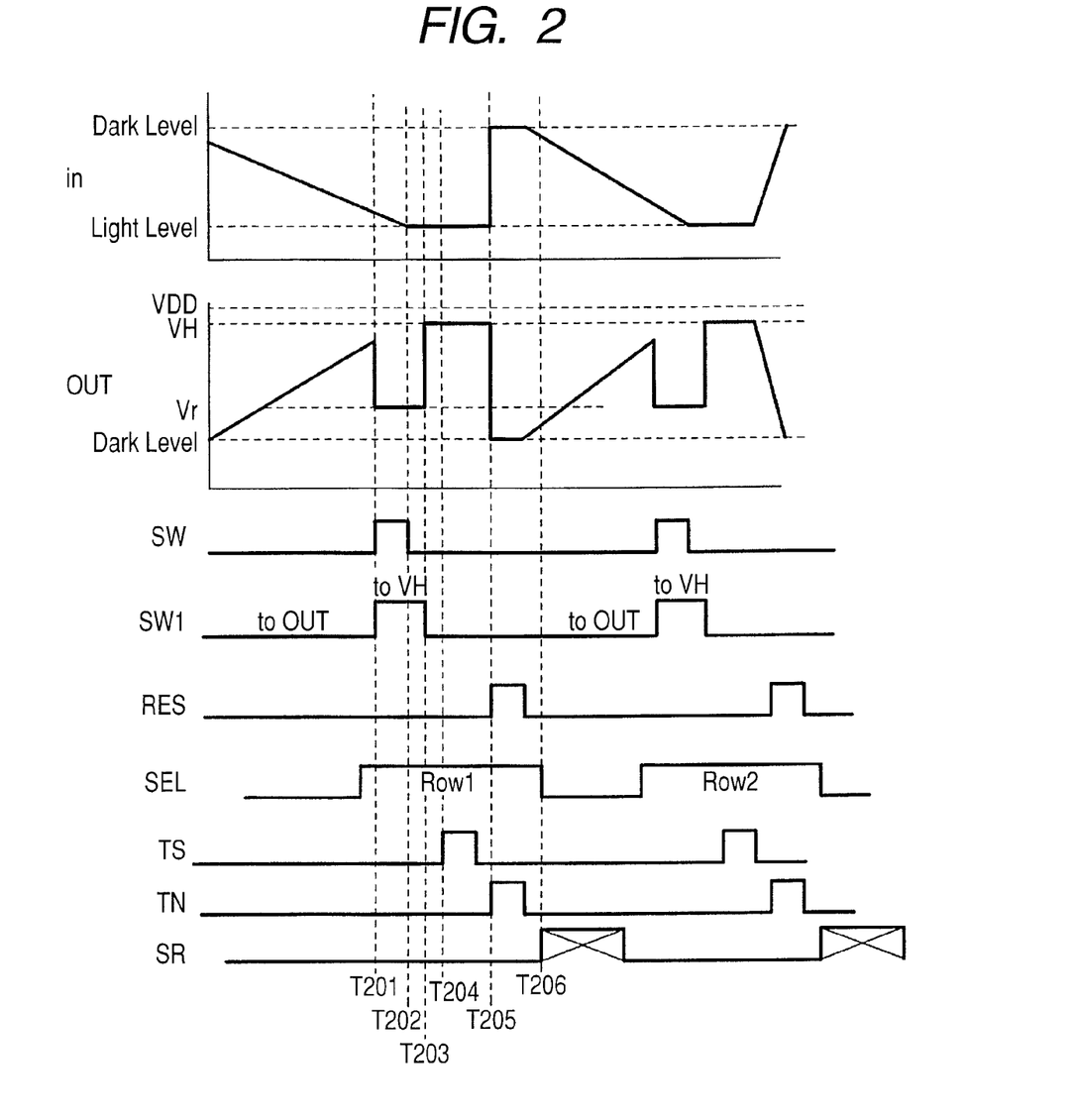
FIG. 2 is a drive timing chart of a dynamic range expansion operation mode in a first embodiment of the present invention.

In FIG. 2, in represents an input terminal of the variable reference amplifier 2. The waveform of the input terminal in is the same as the waveform of the signal output line 14, which is an output of the pixels 1. In FIG. 2, OUT represents an output terminal of the variable reference amplifier 2. The other waveforms indicate pulses of the gate voltages of the respective transistors in FIG. 1. In the dynamic range expansion operation mode in which charge overflowed from the photoelectric conversion unit PD is held in the floating diffusion unit FD, the input terminal in FIG. 2, which is responsive to the voltage of the floating diffusion unit FD, is lowered during the accumulation period.

FIG. 2 is a timing chart illustrating a method for driving a solid-state imaging apparatus according to the present embodiment in the dynamic range expansion operation mode. The transfer switch TX is in an off state all the time except that it enters an on state at the time of a reset operation. More specifically, a reset operation is performed during a period from the time of the switch TN being turned off to the time of the row selection switch SEL being turned off after a time T205. In the dynamic range expansion operation mode, the switch WD is on, and thus, the capacitor 11 is connected to the floating diffusion unit FD.

At a time T201, when the switch SW is turned on, the operational amplifier 22 enters a reset state, and outputs a voltage Vr as a result of virtual grounding of the operational amplifier 22. Simultaneously, the feedback capacitor CF is connected to the node of the voltage VH using the switch SW1. Consequently, the potential difference between Vr and VH is stored in both ends of the feedback capacitor CF.

At a time T202, the switch SW is turned off, and then at a time T203, the switch SW1 is connected to the output terminal OUT, thereby connecting the feedback capacitor CF to the output terminal OUT of the amplifier 2. Consequently, the output terminal OUT of the operational amplifier 22 has the high voltage VH by means of a holding function of the feedback capacitor CF. At a time T204, the switch TS is turned on to temporarily accumulate a pixel signal generated by an exposure to light from the output terminal OUT of the amplifier 2, in the capacitor CTS.

Next, a signal for a reset is output. At a time T205, the pixel reset switch RES is turned on to reset the floating diffusion unit FD of the pixel 1. The input terminal in of the amplifier 2 rises to a dark level (Dark Level), and the output terminal OUT of the amplifier 2 is lowered to the dark level (Dark Level). Simultaneously, a reset signal (noise signal) from the output terminal OUT is temporarily accumulated in the capacitor CTN via the switch TN.

During the period from the times T201 to T205, the row selection switch SEL is turned on, and the pixels 1 during being read out are connected to the operational amplifier 22.

Finally, at a time T206, the switch SR is turned on using the scanning circuit, the signals temporarily accumulated in the capacitors CTS and CTN are output to the output amplifier 4 by capacitive division. The output amplifier 4 deducts the voltage of the capacitor CTN from the voltage of the capacitor CTS, and outputs the resulting voltage. Consequently, a pixel signal (optical signal) with the reset signal (noise signal) removed can be obtained.

According to the above, in the dynamic range expansion operation mode, when reading out an optical signal, that is, a signal of a light level (Light Level) first, a high offset voltage VH is output. Subsequently, when reading out a reset signal, that is, a signal of a dark level (Dark Level), a potential decreased by the amount of the voltage stored in advance in the feedback capacitor CF according to the amount of light, enabling effective use of the dynamic range of the output.

Figure 3:
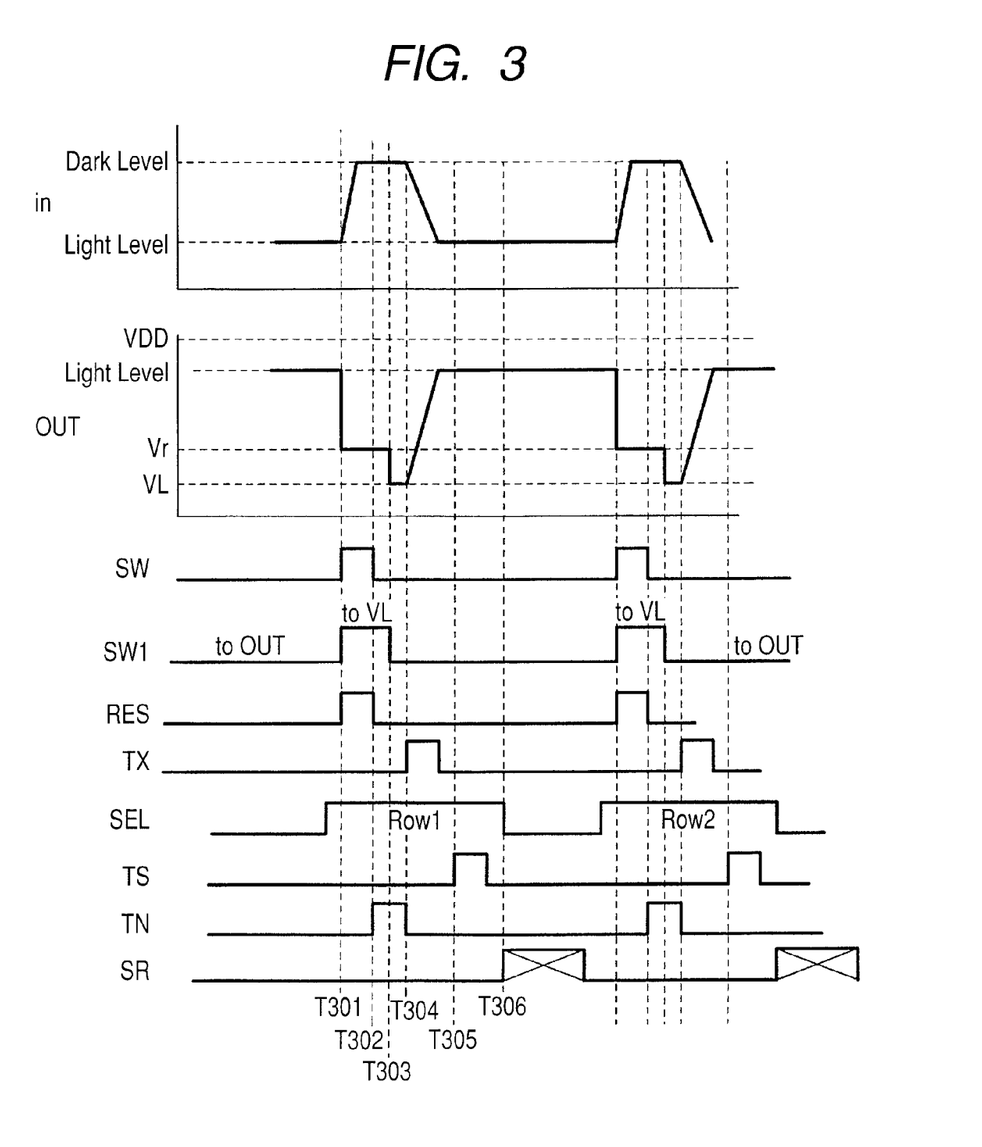
FIG. 3 is a drive timing chart for a normal operation mode in a first embodiment of the present invention.

FIG. 3 is a timing chart illustrating a method for driving the solid-state imaging apparatus according to the present embodiment in the normal operation mode. In the normal operation mode, since the switch WD is off, the capacitor 11 for a wide dynamic range is not connected to the floating diffusion unit FD. The denotation in the timing chart is similar to that in FIG. 2.

As opposed to the dynamic range expansion operation mode, in the normal operation mode, an optical signal is read out after a reset signal (noise signal) is read out. The switch SW1 inserted in series to the feedback capacitor CF is switched between two states, i.e., a state in which it is connected to the low voltage VL and a state in which it is connected to the output terminal OUT of the amplifier 2.

At a time T301, the pixel reset switch RES is turned on to reset the floating diffusion unit FD. Simultaneously, the switch SW is turned on, and the switch SW1 is connected to the node of the low voltage VL, thereby resetting the operational amplifier 22 and applying the low voltage VL to the feedback capacitor CF. The input terminal in of the amplifier 2 rises to a dark level (Dark Level), and the output terminal OUT of the amplifier 2 has the voltage Vr. Consequently, the potential difference between Vr and VL is stored in the feedback capacitor CF.

At a time T302, the switch SW is turned off, and then at a time T303, the switch SW1 is connected to the output terminal OUT, thereby the output terminal OUT of the operational amplifier 22 having the low voltage VL by means of the holding function of the feedback capacitor CF.

At a time T303, the pixel reset switch RES is turned off to make the floating diffusion unit FD in a floating state. The switch TN is turned on to perform sampling and holding of a signal of a dark level (Dark Level) of the output terminal OUT in the capacitor CTN.

At a time T304, the transfer switch TX is turned on to connect the photoelectric conversion unit PD and the floating diffusion unit FD of a read-target pixel 1, thereby transferring a signal from the photoelectric conversion unit PD to the floating diffusion unit FD. Next, at a time T305, the switch TS is turned on to perform sampling and holding of a signal of a light level (Light Level) of the output terminal OUT after the end of the transfer in the capacitor CTS.

At a time T306, the switch SR is turned on using the scanning circuit to output signals temporarily accumulated in the capacitors CTS and CTN to the output amplifier 4 by capacitive division. The output amplifier 4 deducts the voltage of the capacitor CTN from the voltage of the capacitor CTS and outputs the resulting voltage. Consequently, a pixel signal (optical signal) with a reset signal (noise signal) removed can be obtained.

As described above, in the normal operation mode, a reset signal, that is, a signal of a dark level (Dark Level) in FIG. 3 is read first. Here, the reset voltage is made to be a voltage VL, which is lower than Vr, thereby providing a drive method capable of providing a wide dynamic range when subsequently reading an optical signal, that is, a signal of a light level (Light Level) in FIG. 3.

As described above, according to the present embodiment, different reset voltages are set for the amplifier 2 between the dynamic range expansion operation mode and the normal operation mode, enabling provision of a wide output dynamic range of the amplifier 2.

(Second Embodiment)

In the first embodiment, a description has individually been provided for a dynamic range expansion operation and a normal operation. Meanwhile, for a second embodiment of the present invention, an example in which a normal operation to read out a charge accumulated in a photoelectric conversion unit PD is performed subsequent to a dynamic range expansion operation.

Figure 5:
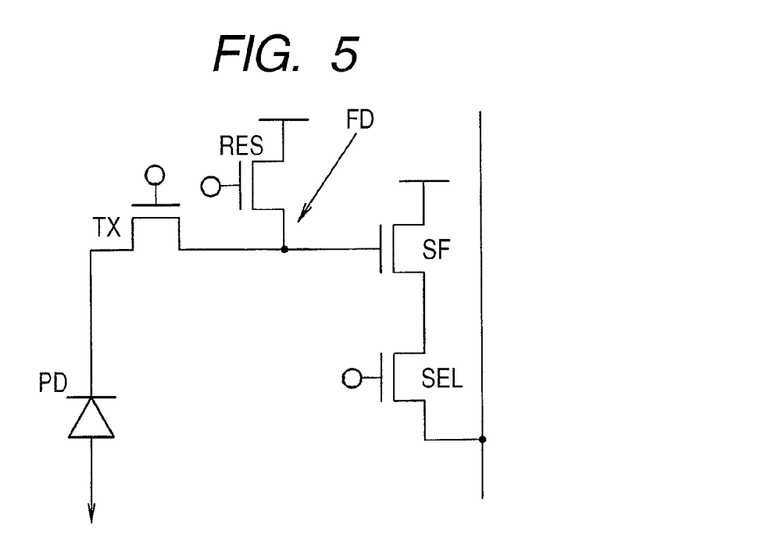
FIG. 5 is an equivalent circuit diagram of a pixel in a second embodiment of the present invention.
Figure 6:
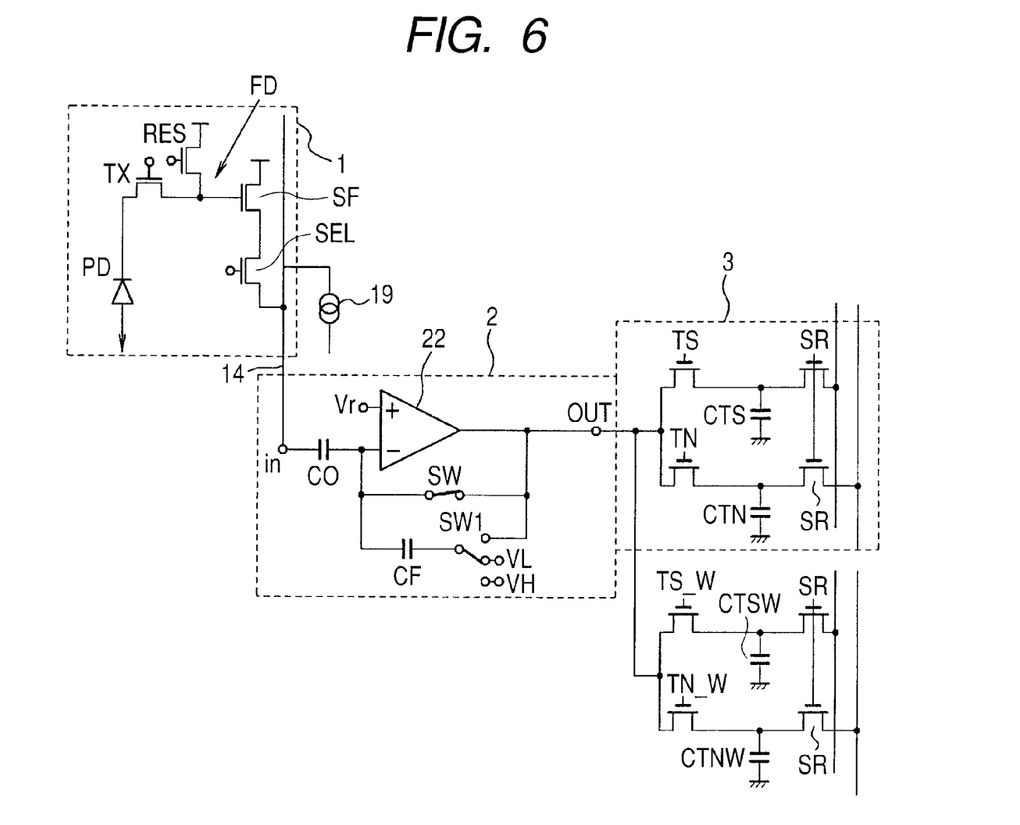
FIG. 6 is a circuit diagram of a solid-state imaging apparatus according to a second embodiment of the present invention.

FIG. 5 is an equivalent circuit diagram of a pixel in a second embodiment of the present invention, and FIG. 6 is a circuit diagram illustrating an example configuration of a solid-state imaging apparatus according to a second embodiment of the present invention. A pixel is configured as illustrated in FIG. 5, and is different from the first embodiment in that it does not include the switch WD and the capacitor 11. The solid-state imaging apparatus is configured as illustrated in FIG. 6, and is provided with two sets of capacitors: capacitors CTSW and CTNW for holding a signal obtained as a result of a dynamic range expansion operation, and capacitors CTS and CTN for holding a signal obtained as a result of reading out a signal accumulated in a photoelectric conversion unit PD in a normal operation.

Figure 4:
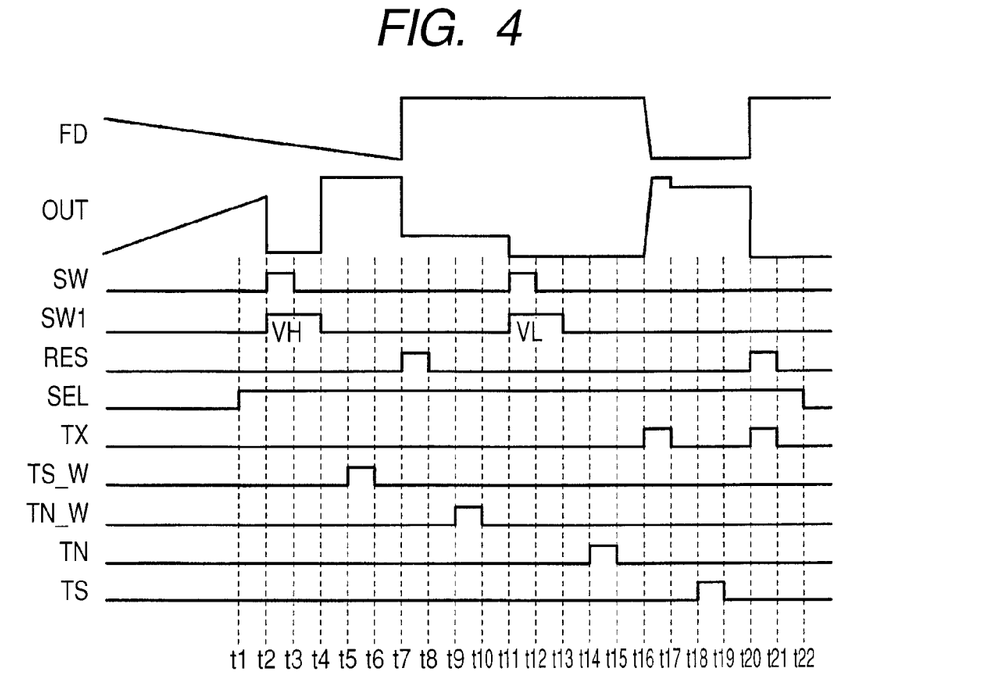
FIG. 4 is a drive timing chart for a second embodiment of the present invention.

FIG. 4 is a timing chart illustrating an example operation of a solid-state imaging apparatus according to the present embodiment. The basic operation is the same as that in the first embodiment. FD represents the voltage of a floating diffusion unit FD in a pixel 1, and OUT represents the voltage of an output terminal OUT of the amplifier 2.

A dynamic range expansion signal is generated as a result of charge overflowed from a photoelectric conversion unit PD when the photoelectric conversion unit PD is full being accumulated in a floating diffusion unit FD via a transfer switch TX. However, where a pixel 1 is irradiated with a small amount of light, charge is not overflowed from a photoelectric conversion unit PD. A source follower transistor SF is an n-type pixel source follower, and a voltage to be output from the source follower transistor SF has a lower value as the amount of optical signal (electrons) overflowed is larger. A switch SW1 is connected to a node of a high voltage VH during a period from t2 to t4, and is connected to a node of the low voltage VL during a period from t11 to t13, and short-circuits a feedback capacitor CF and an output terminal OUT during the rest of the period.

During times t1 to t4, the amplifier 2 is clamped at an output value of the pixel source follower transistor SF. At that time, by means of connecting the switch SW1 to the node of the high voltage VH, the amplifier 2 is set to have a high offset voltage VH, thereby setting the output terminal OUT of the amplifier 2 to be high. During times t5 to t6, in a dynamic range expansion operation mode, a switch TS_W is turned on to accumulate a pixel signal from the output terminal OUT of the amplifier 2 in a capacitor CTSW. Subsequently, during times t7 to t8, a reset switch RES is turned on to reset the floating diffusion unit FD.

Since an amplifier 22 in the present embodiment is an inversion amplifier, the output terminal OUT of the amplifier 2 changes to have a low voltage as a result of the above-described operation. In the conventional art, a problem arises in that this output becomes saturated or the output range is narrowed; however, the present invention enables effective use of the output range of the amplifier 2.

During times t9 to t10, in the dynamic range expansion operation mode, a switch TN_W is turned on to accumulate a reset signal (noise signal) from the output terminal OUT of the amplifier 2 in the capacitor CTNW.

Next, the pixel source follower transistor SF is reset, and in that state, during times t11 to t13, a clamping operation is performed again for the amplifier 2. Here, by means of connecting the switch SW1 to the low voltage VL, the amplifier 2 is set to have a small offset voltage VL, thereby setting the output of the output terminal OUT of the amplifier 2 to be in a low state.

Also, here, by means of connecting the switch SW1 to the output terminal OUT of the amplifier 2, both ends of a feedback capacitor CF may simply be short-circuited. Subsequently, during times t14 to t15, a switch TN is turned on to hold a reset signal from the output terminal OUT in the capacitor CTN. During times t16 to t17, the transfer switch TX is turned on. Next, during times t18 to t19, a switch TS is turned on to hold an optical signal from the output terminal OUT in the capacitor CTS. Subsequently, during times t20 to t21, the reset switch RES and the transfer switch TX are turned on to reset the photoelectric conversion unit PD and charge accumulation is started again. Subsequently, the signals held in the capacitors CTS and CTN, and the capacitors CTSW and CTNW are sequentially read out by means of a scanning circuit.

The present embodiment can easily respond to the case where the mode is switched from the dynamic range expansion operation mode to a normal operation mode in a short time such as several microseconds, and as a result, in both of the operation modes, a full output range of the amplifier 2 can be used.

A characteristic point of the present embodiment lies in the amplifier 2 including the offset voltage setting unit SW1 to effectively use the output range according to the operation mode, and the offset voltage setting unit SW1 may be replaced by another method. A similar effect can be obtained by, for example, changing the voltage Vr of a positive input terminal in the amplifier 2 in FIG. 6.

The present embodiment is related to an example in which the voltage Vr is changed, and is suitable for switching the values of the offset voltage in a short time. In particular, the present embodiment is effective for a solid-state imaging apparatus that provides a widened dynamic range since the operation mode is switched in a short time such as several microseconds.

According to the first and second embodiments, the operational amplifier 22 can provide a variable offset voltage, enabling the voltage immediately after a reset to be set to the high voltage VH or the low voltage VL. Also, a favorable operation can be performed in both the dynamic range expansion operation mode and the normal operation mode, using a simple circuit like the operational amplifier 22.

As a result, a solid-state imaging apparatus that provides a widened dynamic range can effectively use the output range of the amplifier 2, and change the gain while maintaining a high S/N ratio.

As described above, the solid-state imaging apparatuses according to the first and second embodiments each include pixels 1 arranged in one or two dimensions, each of the pixels including a photoelectric conversion unit PD for generating a charge by photoelectric conversion and accumulating the charge; and amplifiers 2 arranged in one dimension, to amplify the charges generated by the pixels 1. Each amplifier 2 includes an offset voltage setting unit SW1 for setting at least two offset voltages, such as the voltages VH and VL. The offset voltage setting unit SW1 set different offset voltages according to the operation modes such as the dynamic range expansion operation mode and the normal operation mode.

Each pixel 1 includes a charge accumulation unit (i.e., a floating diffusion unit FD and/or a capacitor 11) that accumulates a charge overflowed from the photoelectric conversion unit PD. The offset voltage setting unit SW1 sets different offset voltages between an operation mode for reading out the charge accumulated in the photoelectric conversion unit PD and an operation mode for reading out the charge in the charge accumulation unit FD, which has been overflowed from the photoelectric conversion unit PD.

Each amplifier 2 includes an operational amplifier 22 that performs amplification; an input capacitor C0 connected between a signal output line 14 of pixels 1 and an inverting input terminal of the operational amplifier 22; and a feedback capacitor CF that is connectable between an output terminal of the operational amplifier 22 and the inverting input terminal of the operational amplifier 22. The offset voltage setting unit SW1 can selectively connect nodes of at least two offset voltages such as the voltages VH and VL to the feedback capacitor CF.

A switch SW is a switch for connecting the output terminal of the operational amplifier 22 and the inverting input terminal of the operational amplifier 22. One end of the feedback capacitor CF is connected to the inverting input terminal of the operational amplifier 22. The offset voltage setting unit SW1 connects the other end of the feedback capacitor CF to any of the output terminal of the operational amplifier 22 and the nodes of at least two offset voltages such at the voltages VH and VL.

In FIGS. 2 to 4, after the switch SW is turned on and the offset voltage setting unit SW1 connects the other end of the feedback capacitor CF to either of at least two offset voltages such as VH and VL, the switch SW is turned off. Subsequently, the offset voltage setting unit SW1 connects the other end of the feedback capacitor CF to the output terminal of the operational amplifier 22.

The offset voltage setting unit SW1 is connected to nodes of different offset voltages such as VH and VL between the operation mode for reading out the charge accumulated in the photoelectric conversion unit PD and the operation mode for reading out the charge in the charge accumulation unit FD, which has been overflowed from the photoelectric conversion unit PD.

As described above, according to the first and second embodiments, setting of different offset voltages enables use of a suitable dynamic range according to the operation mode, providing a high S/N ratio in the respective operation modes.

Both of the above embodiments indicate mere examples of embodiments for carrying out the present invention, and the technical scope of the present invention should not be limitedly construed by these embodiments. In other words, the present invention can be carried out in various manners without departing from the technical idea and principal features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-058342, filed on Mar. 11, 2009, which is hereby incorporated by reference herein in its entirety.

What is claimed is:
1. A solid-state imaging apparatus comprising:
a plurality of pixels, wherein
each of the pixels includes
a photoelectric conversion unit for generating a charge by photoelectric conversion and accumulating the charge, a pixel amplifier, a charge accumulation unit for accumulating charge overflowed from the photoelectric conversion unit, and a switch for connecting the charge accumulation unit and the pixel amplifier; and
an amplifier connected to the plurality of pixels, which amplifies the charge generated by the photoelectric conversion, wherein the amplifier includes an offset voltage setting unit which sets at least two offset voltages to the amplifier, and wherein the offset voltage setting unit sets a first offset voltage in an operation mode for reading out the charge accumulated in the photoelectric conversion unit while the switch is turned off, and sets a second offset voltage in an operation mode for reading out the charge overflowed from the photoelectric conversion unit and accumulated in the charge accumulation unit while the switch is turned on.

2. The solid-state imaging apparatus according to claim 1, wherein the offset voltage setting unit sets the offset voltages to different levels according to an operation mode of the solid-state imaging apparatus.

3. The solid-state imaging apparatus according to claim 1, wherein the amplifier includes an operational amplifier for amplifying, an input capacitor connected between a signal outputs of the pixels and an inverting input terminal of the operational amplifier, and a feedback capacitor connected between an output terminal and the inverting input terminal of the operational amplifier, and the offset voltage setting unit selectively connects the feedback capacitor to any one of the at least two offset voltages.

4. The solid-state imaging apparatus according to claim 3, further comprising a second switch for connecting the output terminal of the operational amplifier to the inverting input terminal of the operational amplifier, wherein one terminal of the feedback capacitor is connected to the inverting input terminal of the operational amplifier, and the offset voltage setting unit selectively connects the other terminal of the feedback capacitor to any of the output terminal of the operational amplifier and the at least two offset voltages.

5. The solid-state imaging apparatus according to claim 4, wherein after turning on the second switch, and after connecting, by the offset voltage setting unit, the other terminal of the feedback capacitor to any of the output terminal of the operational amplifier and the at least two offset voltages, the second switch is turned off, and thereafter the offset voltage setting unit connects the other terminal of the feedback capacitor to the output terminal of the operational amplifier.

6. The solid-state imaging apparatus according to claim 5, wherein the offset voltage setting unit connects the feedback capacitor to different offset voltages in an operation mode for reading out the charge accumulated in the photoelectric conversion unit and in an operation mode for reading out a charge overflowed from the photoelectric conversion unit.

7. A driving method of a solid-state imaging apparatus comprising:

a plurality of pixels, wherein each of the pixels including a photoelectric conversion unit for generating a charge by photoelectric conversion and accumulating the charge, a pixel amplifier, a charge accumulation unit for accumulating charge overflowed from the photoelectric conversion unit, and a switch for connecting the charge accumulation unit and the pixel amplifier; and an amplifier connected to the plurality of pixels, to amplify the charge generated by the photoelectric conversion, and wherein the driving method comprising:

a offset voltage setting step of setting different offset voltages for the amplifier, wherein in the offset voltage setting step, a first offset voltage is set for in an operation mode for reading out the charge accumulated in the photoelectric conversion unit while the switch is turned off, and a second offset voltage is set for an operation mode for reading out the charge overflowed from the photoelectric conversion unit and accumulated in the charge accumulation unit while the switch is turned on.

\* \* \* \* \*